Feb. 19, 1935.  E. B. NICKLES  1,991,569
FRICTION CLUTCH
Filed July 29, 1932   3 Sheets-Sheet 2
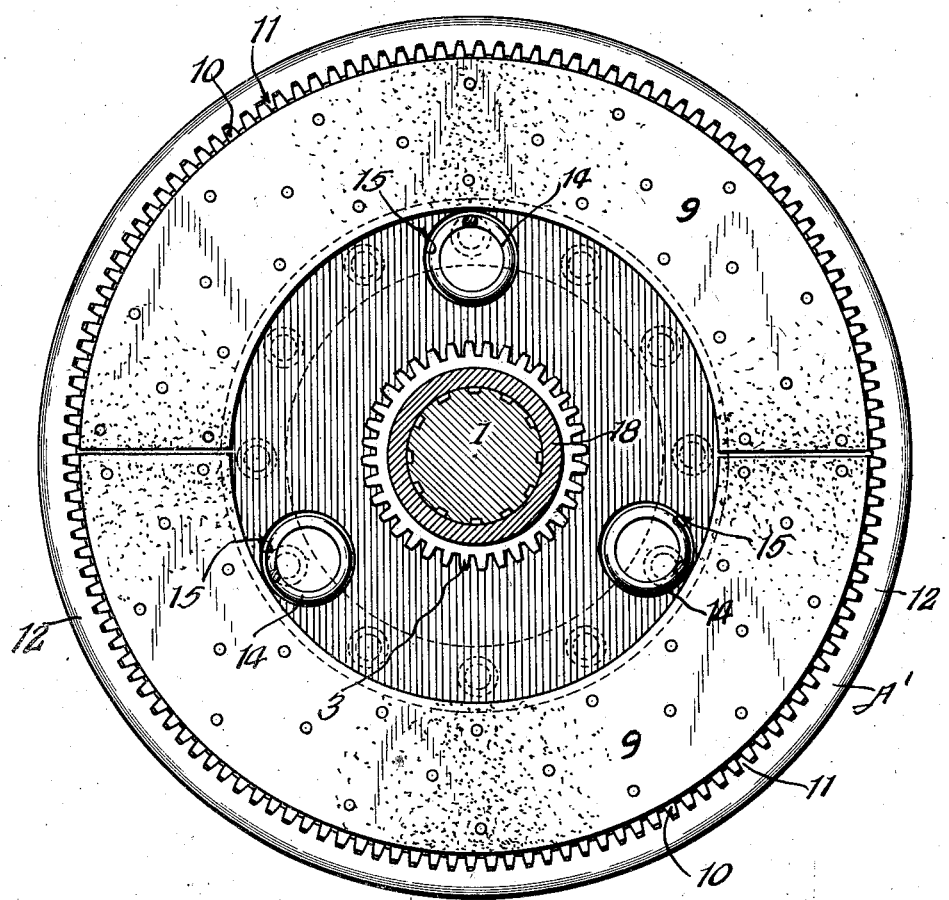
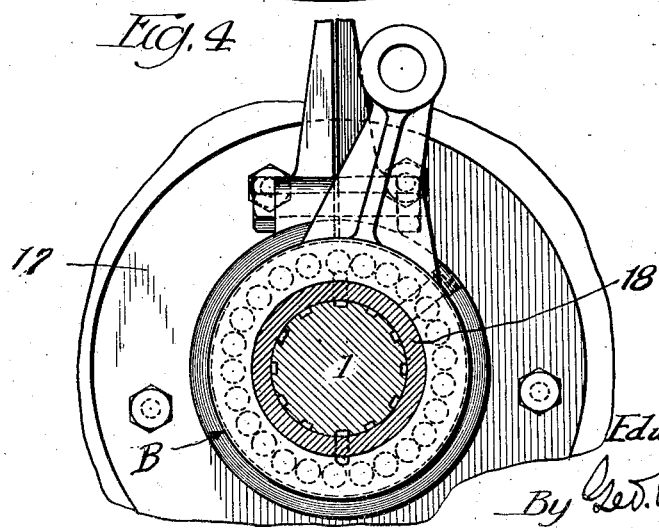
Inventor
Edward B. Nickles
By Geo. W. Waldo Atty.

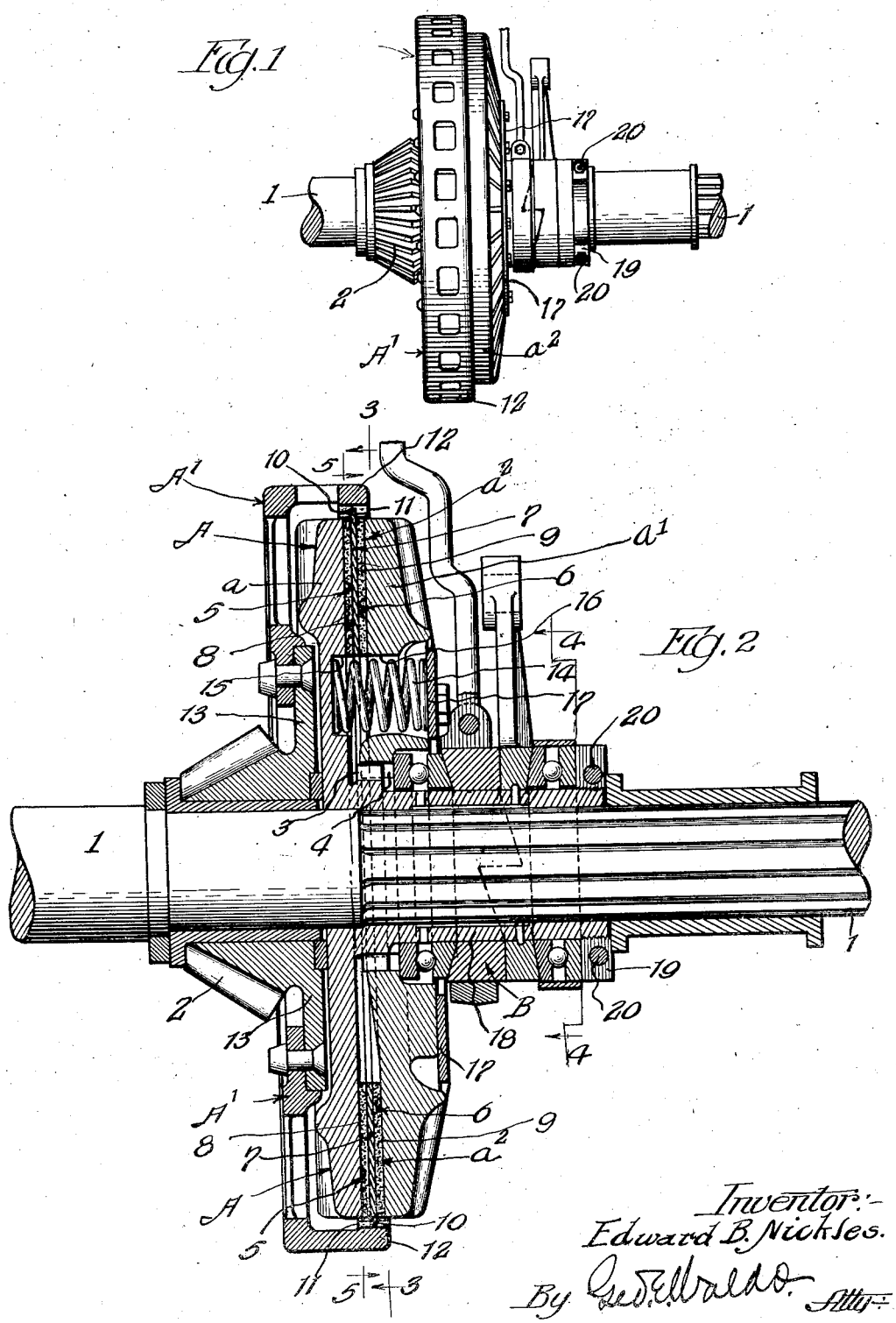

Feb. 19, 1935.   E. B. NICKLES   1,991,569
FRICTION CLUTCH
Filed July 29, 1932   3 Sheets-Sheet 3

Inventor
Edward B. Nickles.
By Geo. T. Elbaldo
Atty.

Patented Feb. 19, 1935

1,991,569

UNITED STATES PATENT OFFICE 1,991,569

FRICTION CLUTCH

Edward B. Nickles, Manitowoc, Wis., assignor to Manitowoc Shipbuilding Corporation, Manitowoc, Wis., a corporation of Wisconsin Application July 29, 1932, Serial No. 625,734

1 Claim. (Cl. 192—68)

This invention relates to clutches and relates particularly to clutches of the friction disk type.

Stated generally, a principal object of the invention is to provide a disk clutch of improved and simplified construction, which is strong, durable and effective in operation.

A specific object of the invention is the provision of means in a clutch of the general type specified, for quickly and conveniently removing and replacing the friction disk or disks when it is desired to replace the friction disks or to renew the linings thereof when they become worn in use.

To effect the objects thereof, a clutch embodying my invention and improvements comprises the various features, combinations of features and details of construction hereinafter described and claimed.

In the accompanying drawings, in which a preferable form of the invention is fully illustrated, Fig. 1 is a side elevation of a clutch embodying my invention and improvements.

Fig. 2 is a central, vertical sectional view thereof.

Fig. 3 is a sectional elevation substantially on the line 3—3 of Fig. 2, looking in the direction indicated by the arrows, the movable clutch member and parts directly associated therewith being omitted.

Fig. 4 is a fragmentary sectional elevation substantially on the line 4—4 of Fig. 2, slightly enlarged.

Figure 5:
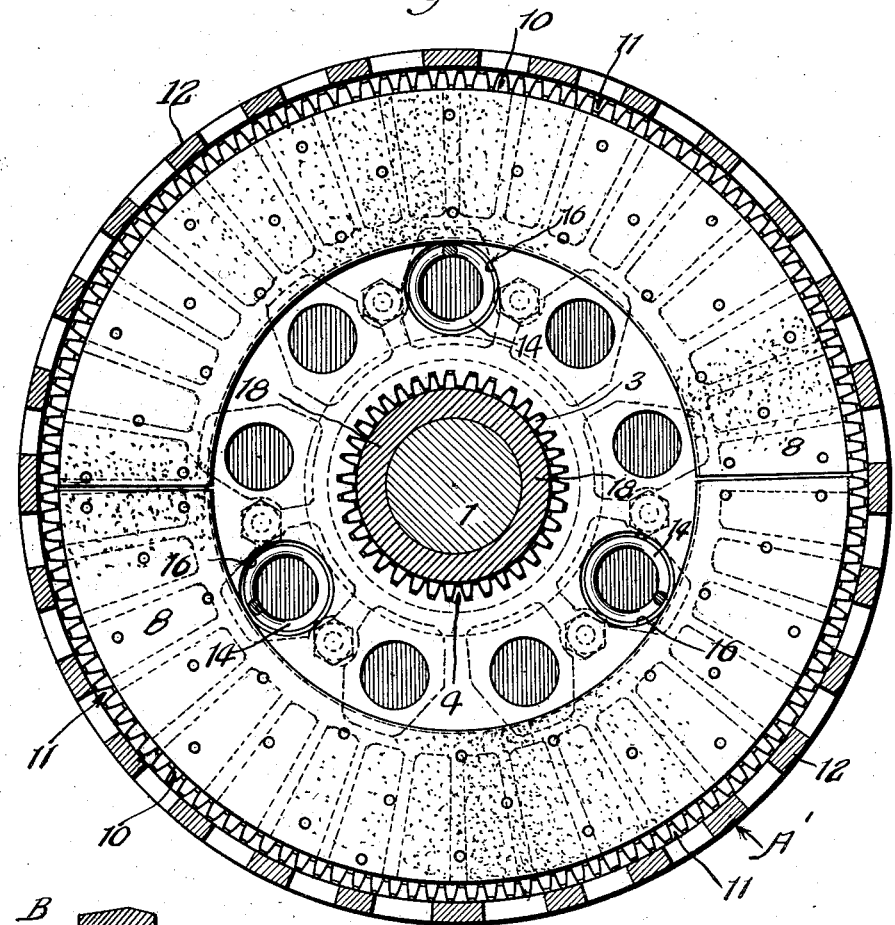
Fig. 5 is a sectional elevation of the clutch, substantially on the line 5—5 of Fig. 2, looking in the direction indicated by the arrows, the fixed clutch member and associated parts being omitted.
Figure 6:
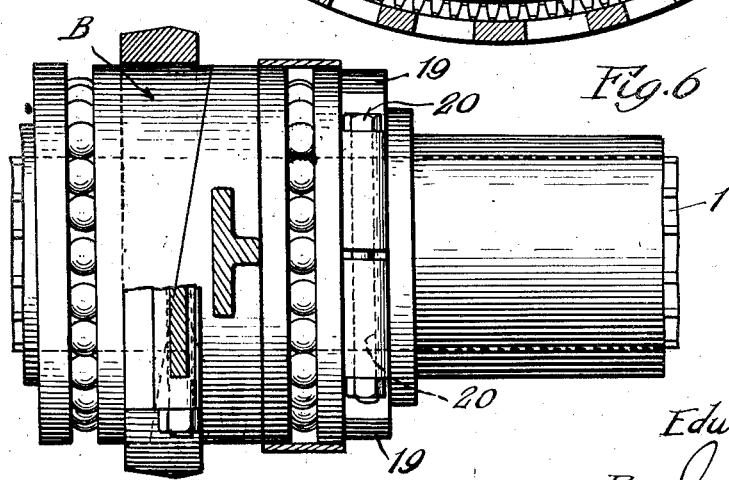
Fig. 6 is a detached and enlarged top plan view, partly in section, of the clutch operating assembly.

Describing the invention with reference to the drawings, 1 designates a power shaft which may be driven from a source of power, not shown, rotatably mounted on which in fixed axial position is a bevel transmission gear 2, which is adapted to be secured to said shaft so as to rotate therewith by means of my improved clutch, designated as a whole A in the manner presently described. Said transmission gear 2 exemplifies any usual or desired power transmission means.

The clutch proper comprises clutch members $a$, $a'$, the clutch member $a$ being secured in fixed position on the shaft 1 both as regards axial and turning movement, in any usual or approved manner.

The clutch member $a'$ is mounted on the clutch member $a$ so as to turn therewith, while at the same time, being movable towards and from the same. As shown, said clutch member $a'$ is mounted on and secured to the member $a$ by intermeshing external and internal gears 3 and 4 formed thereon, respectively, whereby said clutch member $a'$ will be supported substantially concentric with the clutch member $a$ and will be movable towards and from the same in the manner desired.

In accordance with my invention, the clutch members $a$, $a'$ are provided with opposed friction surfaces 5 and 6, mounted between which is a friction disk designated as a whole $a^2$, consisting of a parallel sided ring 7, preferably made of steel plate, secured to opposite sides or faces of which are correspondingly shaped clutch linings 8 and 9. Within the scope and contemplation of the invention, said clutch linings may be secured to the ring in any desired manner, what I now consider preferable means for the purpose consisting of tubular brass rivets, the holes in said lining which receive the heads of said rivets, preferably being counter-bored so that the ends of said rivets will be below the exposed surfaces of said clutch linings, in a usual manner. Desirable material from which to make said clutch linings is asbestos composition.

The radial dimensions of the clutch linings 8 and 9 conform substantially to the corresponding dimensions of the friction surfaces 5 and 6 on the clutch members $a$, $a'$, while the plate 7 projects radially beyond said clutch members and has teeth 10 formed on its periphery, which intermesh with an internal gear 11 on a flange 12 of a spider designated as a whole A', secured to a circular flange 13 formed on the hub of the beveled transmission gear 2, as shown, see particularly Fig. 2. Said spider preferably is made of cast steel and to reduce its weight and to prevent excessive heating thereof, preferably is skeletoned, as shown. For convenience and economy of manufacture, the transmission gear 2 and spider A' are formed as separate parts and are riveted or otherwise secured together to form a rigid unitary structure.

The faces of the teeth of the internal gear 11 are made sufficiently long to provide for contemplated movement of the movable clutch member $a'$ relative to the fixed clutch member $a$ to throw the clutch "in" and "out" without disengaging the gear 11 from the gear 10 on the clutch disk 7. With the described construction, it is obvious that rotation imparted to the friction disk $a^2$ through engagement of the gear teeth 10 thereon with the gear teeth 11 on the spider A' will impart corresponding rotation to said spider and thus to the bevel gear 2.

As installed for use, the movable clutch member $a'$ is maintained normally at the limit of its movement from the fixed clutch member $a$ by springs 14 inserted under compression between rigid parts of said clutch members, in a usual manner. As shown, the springs 14 are coil springs, the ends thereof which react against the clutch member $a$ being seated in recesses 15 formed therein, said springs extending through holes 16 formed in the clutch member $a'$ and being confined therein under compression by plate 17 bolted or otherwise secured to the outer side of said clutch member, as shown, and which sustain the thrust of said springs.

As heretofore stated, an important feature of my improved clutch resides in the provision of means whereby the friction disk $a^2$ may quickly and conveniently be removed and replaced when desired as for the purpose of renewing the clutch linings 8 and 9 when they become worn in use. In accordance with my invention, I attain this end by severing said friction disk diametrically, to form separate similar parts, which may be inserted laterally into position between the clutch members $a$, $a'$, and withdrawn therefrom by releasing the movable clutch member $a'$ to permit movement thereof and of said friction disk $a^2$, away from the fixed clutch member $a$ to a position entirely outside of the spider A' in which, of course, the gear 10 on the plate 7 will be disengaged from the internal gear 11 on said spider, thus permitting withdrawal of the separate parts of the friction disk $a^2$, in the manner contemplated.

As shown, the clutch operating mechanism designated as a whole B, exemplifies any desired or usual anti-friction, cam-actuated type of clutch, and a clutch suitable for the purpose can readily be supplied by mechanics familiar with such structures. Preferably and as shown, also, my improved clutch forms a self-contained unit, the clutch-operating assembly B, being mounted on a sleeve 18 secured to and preferably formed integral with the fixed clutch member $a$, and being confined in operating position on said sleeve by a nut 19 which has threaded engagement with said sleeve. As shown, also, the thrust nut 19 is split diametrically, the parts thereof being secured together by clamping screws 20, providing means for securing said nut in position on said sleeve corresponding to desired operating relation of the constituent members of the clutch A and clutch operating mechanism B.

In accordance with my invention, also, I attain the object thereof as it relates to the provision of means for disengaging the friction disk $a^2$ from the spider A' by so proportioning the thickness of the thrust nut 19 that when said nut is removed from the sleeve 18, a space of sufficient width will be provided to permit retraction of said friction disk $a^2$ in the manner desired in which the sections of said friction disk may be removed and replaced laterally, without dismantling other parts of the clutch.

While, as shown in the drawings, the clutch comprises only one friction disk $a^2$, my invention contemplates, equally, the use of a plurality of friction disks all interposed between the pressure members $a$, $a'$, all thereof being provided with co-acting friction surfaces and all thereof having teeth 10 formed in their peripheries which intermesh with the internal gear teeth 11 on the flange 12 of the spider A'. The only changes necessitated by this construction are to make the faces of the teeth 11 of sufficient length to, at all times, engage the teeth 10 of all of the friction disks $a^2$ in operation, as contemplated, and to so proportion the dimension of the split nut 19 axially of the sleeve 18 to provide for necessary movement of the friction disks $a$, $a^2$, and parts interposed between said friction disks and said split nut to effect disengagement of all of said friction disks from the spider A' to provide for removing and replacing said friction disks. Obviously, also, all of said friction disks will comprise a plurality of segments which may be withdrawn and replaced laterally as heretofore described in connection with a single friction disk $a^2$.

I claim:

In combination, a power shaft, a power transmission member normally free to turn thereon, a sleeve secured in fixed axial position on said shaft and rotatable therewith, clutch pressure members provided with opposed surfaces mounted on said sleeve, one thereof being fixed to said sleeve, and the other being movable towards and from said fixed clutch member, means connecting said clutch pressure members for supporting and driving said movably supported member, a friction member, means for supporting said friction member between the pressure members of the clutch and for connecting said friction member with the power transmission means on the shaft, whereby rotation of the shaft will impart rotation to said power transmission member, comprising a spider secured to the transmission member on the power shaft, a flange thereon which extends over the friction member of the clutch and interlocking parts on said spider flange and friction member, said friction member consisting of sections which are separately removable and replaceable laterally when said friction member is disengaged from said spider, and clutch operating mechanism comprising thrust means, a thrust nut having threaded engagement with the clutch sleeve against which the clutch operating means reacts, said thrust nut also being split to form separate parts, and bolts which detachably secure the parts of said nut together in threaded engagement with the clutch sleeve, the axial dimension of said nut being such that when detached, parts of the clutch, including the friction member may be moved axially of the clutch sleeve to effect engagement and disengagement of the sections of said friction member with and from said spider, thereby providing for removing and replacing the sections of said friction member radially without dismantling the general clutch assembly.

EDWARD B. NICKLES.